United States Patent [19]

Byer

[11] 4,455,657
[45] Jun. 19, 1984

[54] STABLE SINGLE AXIAL MODE Q SWITCHED LASER OSCILLATOR WITH INJECTION LOCKING

[75] Inventor: Robert L. Byer, Stanford, Calif.

[73] Assignee: The Board of Trustees of the Leland Stanford Junior University, Stanford, Calif.

[21] Appl. No.: 493,954

[22] Filed: May 12, 1983

Related U.S. Application Data

[63] Continuation of Ser. No. 199,690, Oct. 23, 1980, abandoned.

[51] Int. Cl.$^3$ ............................................. H01S 3/098
[52] U.S. Cl. ......................................... 372/18; 372/32
[58] Field of Search .................... 372/18, 19, 31, 95, 372/12, 32, 70, 29

[56] References Cited

U.S. PATENT DOCUMENTS 4,197,513  4/1980  Bell et al. ............................... 372/12

OTHER PUBLICATIONS

Park et al., "Stable Single-Axial-Mode Operation of an Unstable-Resonator Nd:YAG Oscillator by Injection Locking", *Optics Letter*, vol. 5, No. 3, Mar. 1980, pp. 96–98.

Herbst et al., "A 200 MJ Unstable Resonator Nd:YAG Oscillator", *Optics Communications*, vol. 21, No. 1, Apr. 1977, pp. 5–7.

Meyer, "Single Mode $CO_2$-Laser Pulses of High Power", *Physics Letters*, vol. 58A, No. 3, Aug. 23, 1976, pp. 167–168.

*Primary Examiner*—James W. Davie
*Attorney, Agent, or Firm*—Flehr, Hohback, Test, Albritton & Herbert

[57] ABSTRACT

A stable high gain laser includes a Q switched multiple axial mode high gain oscillator, an oscillator for generating a stable optical wave at a first frequency, the first frequency being within the band of the multiple modes of operation, and a coupler for injecting the stable optical wave into the high gain oscillator whereby the axial mode nearest to the frequency of the injected wave selects a single axial mode and through gain saturation suppresses other modes of the high gain oscillator.

2 Claims, 5 Drawing Figures

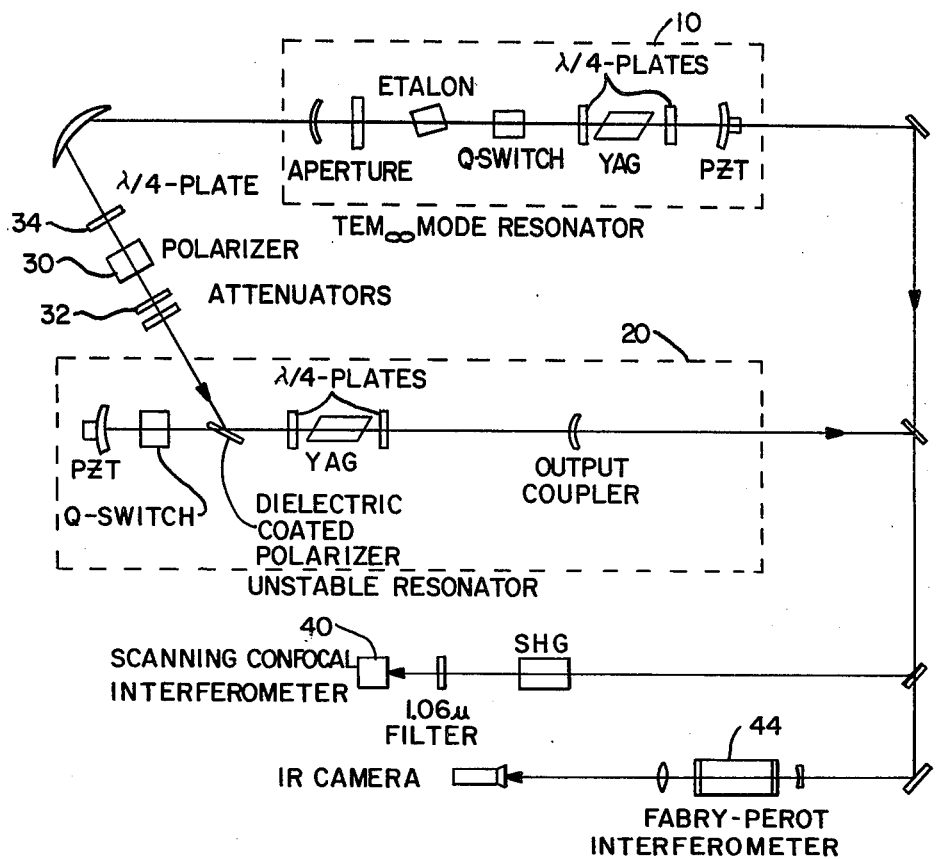
FIG.—1
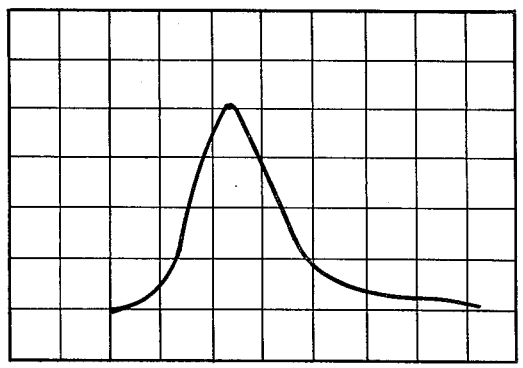
FIG.—2

STABLE SINGLE AXIAL MODE Q SWITCHED LASER OSCILLATOR WITH INJECTION LOCKING

The U.S. Government has rights in this invention pursuant to U.S. Air Force Contract No. F 49620-77-C-0092.

This is a continuation, of application Ser. No. 199,690 filed Oct. 23, 1980, now abandoned.

This invention relates generally to lasers, and more particularly the invention relates to Q switched multiple axial mode laser oscillator.

The laser utilizes a cavity resonator to facilitate the interaction of a light wave with the atoms of the lasing material and thereby produce an amplified light wave. The resonator has an axial dimension which is many times the desired light wave length and hence the resonator can have several axial modes or frequencies of resonance. One method of generating an amplified light wave at a selected axial mode or frequency is to provide etalons within the cavity which pass only the selected frequency. However, such loss selective methods limit the output power and are only partially successful in selecting a single axial mode for a high gain laser oscillator.

Much higher output power can be achieved with a Q switched laser including a rare earth material such as neodymium in a host crystal such as yttrium aluminum garnet (e.g. Nd: YAG material). In the Q switched technique, the optical path within the resonator cavity is blocked by a shutter. The laser material is excited but laser action is prevented by the shutter. The shutter is then opened and the stored energy is released in a large pulse having hundreds or thousands of megawatts of power.

The Q switched laser oscillates in several axial modes which beat together and lead to large amplitude fluctuations. Single axial mode operation of a high-gain Q switched solid state laser has not yet been realized in a reliable manner by use of conventional spectral selective techniques such as etalons within the resonator. Single axial mode operation is desirable because of improved amplitude stability and narrow Fourier transform limited spectral line width.

Accordingly, an object of the present invention is an improved method of operating a high gain Q switched laser in a single axial mode.

Another object of the invention is a high gain Q switched laser which has improved amplitude stability.

A feature of the invention is the use of an injected optical wave at a frequency within the band encompassing the multiple modes of the resonator whereby saturation of an axial mode nearest to the frequency suppresses further growth at adjacent axial modes. The mode that dominates can be selected by the injected signal within the limits set by the injected power level and the detuned frequency range. During the amplification process, the detuned injected wave experiences a rapid phase change which results in a frequency shift towards the nearest axial mode resonance of the resonator, resulting in a single axial mode output at a frequency determined by the resonator.

A stable high gain laser in accordance with the invention includes a Q switched multiple axial mode high gain laser oscillator, means for generating a stable optical wave at a first frequency, the first frequency being within the band of the multiple modes of operation, and means for injecting the stable optical wave into the high gain resonator whereby the axial mode nearest to the frequency of the injected wave suppresses other modes of the high gain resonator.

The invention and objects and features thereof will be more readily apparent from the following detailed description and appended claims when taken with the drawing, in which:

FIG. 1 is a schematic of one embodiment of a stable high gain laser in accordance with the invention.

FIG. 2 is a photograph of an oscilloscope trace of 200 Q switched pulses showing the power versus time and illustrating the high degree of amplitude stability.

Figure 3:
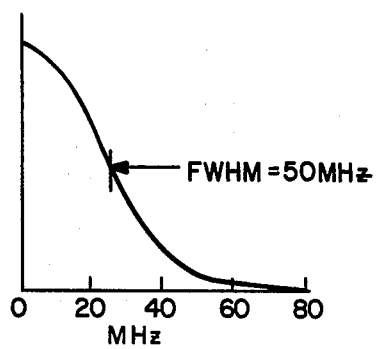
FIG. 3 is a Fourier transform of the pulse of FIG. 2.

Referring now to the drawings, FIG. 1 is a schematic of one embodiment of a laser in accordance with the invention. A $TEM_{oo}$-mode stable-resonator Nd:YAG oscillator 10 with a 35-cm-long cavity and an air-spaced 0.2-cm$^{-1}$ free spectral range etalon with finesse of 5 is used as the single axial mode source in this embodiment. The $TEM_{oo}$-mode source is pulsed at 10 pulses per second and operates near threshold at 6-J flashlamp energy to minimize thermal effects in the 4-mm×50-mm Nd:YAG rod. Quarterwave plates are used to eliminate spatial hole burning. An electronically controlled Q switch is used to enhance single axial mode selectivity by allowing the oscillator to prepulse before opening the Q switch. The cavity length is controlled by a PZT transducer. A Q switch Nd:YAG slave oscillator 20 is of standard design with a 6.3-mm×50-mm diameter Nd:YAG rod within a 60-mm long confocal positive branch unstable resonator oscillator. The cavity length is also controlled by a piezoelectric transducer. The Invar spaced resonator structure is mechanically stable and compensates for thermal length expansion.

Injection locking is accomplished by injecting approximately 0.1% of the $TEM_{oo}$-mode master oscillator 10 non-Q switched pre-pulse power into the unstable resonator through a dielectric polarizer element 30. The cavities are decoupled by attenuators 32 and a quarter-wave plate polarizer optical isolator 34. Quarter-wave plates are also used in the unstable resonator oscillator to eliminate spatial hole burning.

Injected locking may also be accomplished by injecting single mode power through a partially transmitting mirror of the unstable resonator oscillator. The single axial mode $TEM_{oo}$ oscillator may also operate in the cw mode.

The output optical spectra of the stable and unstable resonators are observed with both a scanning 2-GHz free spectral range Spectra-Physics confocal interferometer 40 at 0.532 $\mu$m and a Fabry-Perot interferometer 44 imaged through an infrared vidicon at 1.06 $\mu$m. The scanning confocal interferometer has a 10-MHz resolution and the Fabry-Perot interferometer a 556-MHz free spectral range with a finesse of 30 for 18.5-MHz resolution at 1.064 $\mu$m.

The spectrum of the $TEM_{oo}$-mode master oscillator was measured under Q switched operation to provide adequate output energy for the measurement. A 50-nsec Q switched pulse has a measured 1.064 $\mu$m optical bandwidth of 10 MHz with a $\pm 5$-MHz frequency fluctuation. A major contribution to the frequency jitter was thermal fluctuations caused by a combination of flashlamp energy variations and water-cooling instabilities. The Fourier-transform bandwidth of a 50-nsec pulse is calculated to be 9 MHz in good agreement with the measured value.

The non-Q switched pre-pulse from the $TEM_{oo}$-mode master oscillator was injected into the unstable resonator at near the 10-$W/cm^2$ intensity level for initial injection-locking measurements. For a cavity frequency detuning within the locking range, single-mode output of the unstable-resonator source was obtained. Optical bandwidth measurements at the 150-mJ output energy level showed that the 9-nsec Q switch pulse had a bandwidth of 58 MHz with a frequency jitter of ±5 MHz. Single-mode operation was confirmed by interferometer observations and by mode-beating measurements with a 7904 oscilloscope.

Figure 4:
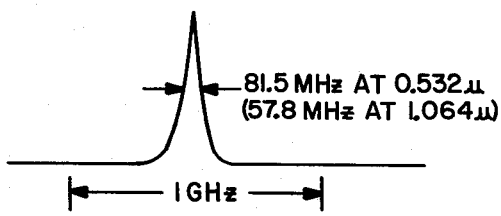
FIG. 4 is a plot of optical spectrum of the laser pulse of FIG. 2 at the second harmonic wave length.

FIG. 2 shows a multiple exposure of 200 Q switched pulses with better than 1-nsec time resolution. A Fourier transform of the Q switch pulse shown in FIG. 3 is in agreement with the measured optical bandwidth of 58 MHz. A careful search for adjacent axial-mode output confirmed that, if present, the adjacent mode power is below the sensitivity of our detection system, or less than one thousandth of the oscillating single-mode power. FIG. 4 is a plot of the optical spectrum of the laser pulse at the second harmonic wavelength taken with the scanning confocal interferometer over a two minute scan time. The measured 0.5320 μm bandwidth of 81.5 MHz, or 57.8 MHz at 1.064 μm, agrees to within the interferometer resolution with the Fourier-transform bandwidth.

Circuitry as shown in FIG. 1 has experimentally confirmed a prediction of the injection-locking theory for high-gain Q switched operation that the output frequency is determined by the cavity resonance of the unstable-resonator slave oscillator and not by the injected frequency.

Figure 5:
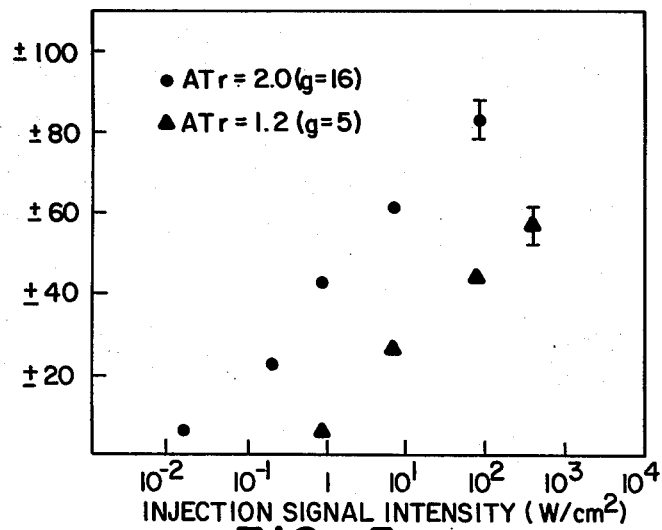
FIG. 5 is a plot illustrating the frequency detuning range for a single axial mode operation versus injection intensity at two unstable resonator gain levels.

To make a quantitative measurement of the frequency detuning range versus injection power, the injection-locking limit was defined as operation with at least a 10:1 power ratio between the principal and adjacent axial modes. FIG. 5 shows the detuning range versus input-injection power at two gain settings of the unstable resonator source. FIG. 5 shows that the injection detuning range is linearly proportional to the logarithm of the used injection levels. It also shows that injection locking is more readily accomplished at the high-gain condition for the unstable resonator slave oscillator. Finally, an injection intensity as low as 0.1 $W/cm^2$ was adequate to ensure a single axial mode operation of the unstable resonator oscillator.

The injection locking range and required injection intensity have been theoretically studied. The theory and experiments are in excellent agreement. In addition, an extension of the theory has provided an approximate analytical expression relating the injected intensity and detuning range for successful injection locking. The theory for transient injection locking has as one of its limiting cases the theory of steady state injection locking which is well known and which has been previously applied to cw laser devices. However, the theory of transient injection locking and its application to high gain laser sources is a recent development and has not been described previously.

Stable single axial mode operation of a high gain laser including a Q switched multiple axial mode laser oscillator has been provided in accordance with the invention. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A stable high gain solid state laser comprising
   a Q-switched multiple axial mode high gain oscillator comprising neodymium in a host crystal of yttrium aluminum garnet,
   an optical oscillator for generating an optical wave and including band pass means for limiting the frequency of said optical wave to a single axial mode, said optical oscillator generating a stable optical wave at a first frequency, said first frequency being within the band of said multiple modes, and
   means for injecting said stable optical wave into said high gain oscillator whereby an axial mode nearest to said frequency selects a single axial mode and through gain saturation suppresses other axial modes of said high gain oscillator.

2. A stable high gain laser as defined by claim 1 wherein said band pass means comprises an etalon.

* * * * *